Dec. 15, 1925.

H. CHRISMAN

PROTECTIVE CASING FOR GASKETS

Filed Oct. 29, 1921

WITNESSES
J. Herbert Bradley

INVENTOR
Horace Chrisman
By Green & McCallister
his Attorneys

Patented Dec. 15, 1925.

1,565,793

UNITED STATES PATENT OFFICE.

HORACE CHRISMAN, OF EDGEWOOD, PENNSYLVANIA, ASSIGNOR TO PITTSBURGH METER COMPANY, OF EAST PITTSBURGH, PENNSYLVANIA, A CORPORATION OF PENNSYLVANIA.

PROTECTIVE CASING FOR GASKETS.

Application filed October 29, 1921. Serial No. 511,434.

*To all whom it may concern:*

Be it known that I, HORACE CHRISMAN, a citizen of the United States, and a resident of Edgewood, in the county of Allegheny and the State of Pennsylvania, have made a new and useful Invention in Protective Casings for Gaskets, of which the following is a specification.

This invention relates to protective coverings for rubber or similar gaskets and has for an object to produce means for preventing the gasket from adhering to associated parts such as the members between which it is compressed.

Where rubber gaskets are employed for the purpose of sealing a joint, they are maintained under pressure by the associated parts forming the joint. Under such conditions, they are likely to, and ordinarily do, stick to the associated parts and are usually damaged and rendered unfit for use when the parts are disassociated.

An object of my invention is to provide means for protecting gaskets such as rubber gaskets by preventing sticking to the associated parts.

Figure 1:
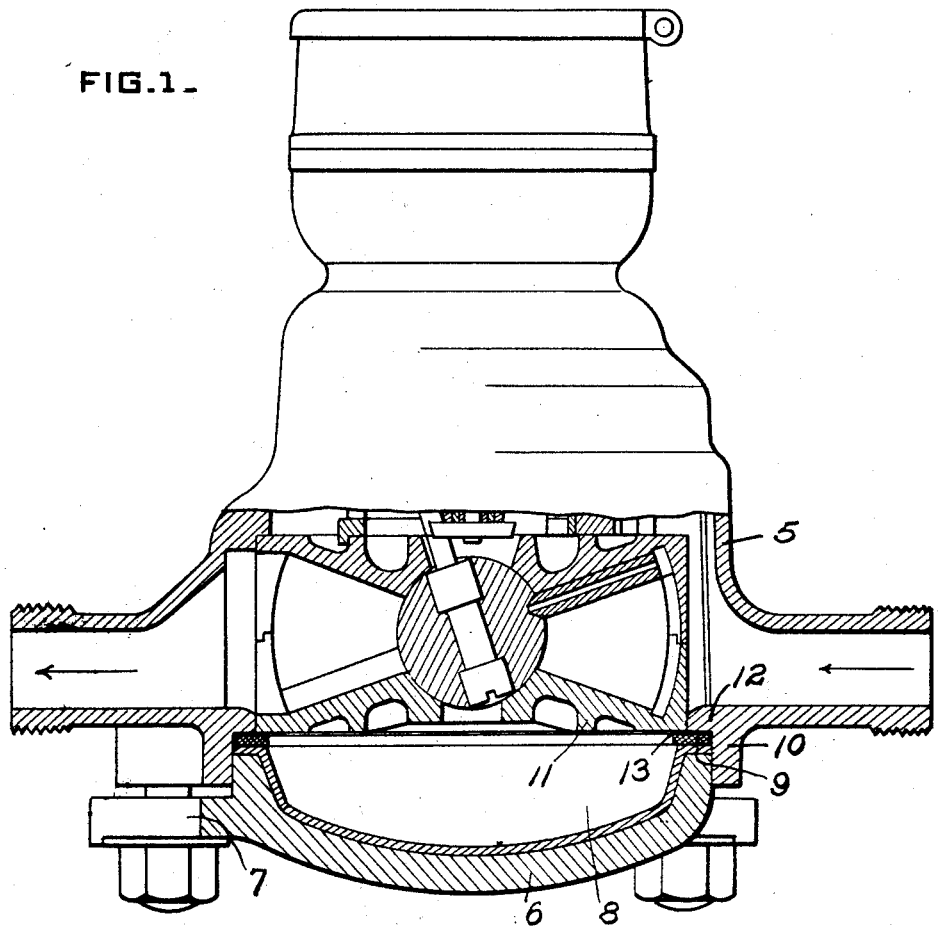
Figure 2:
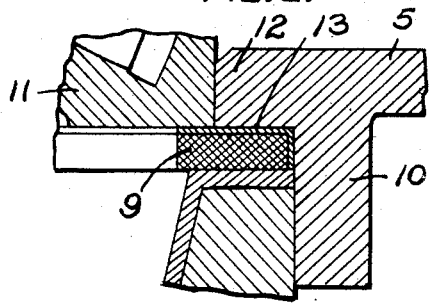
Figure 3:
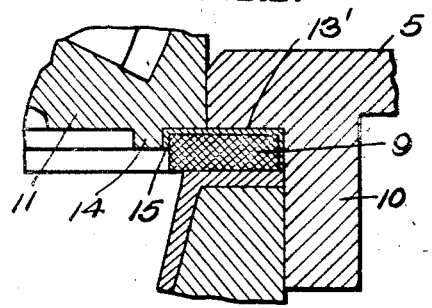
Figure 4:
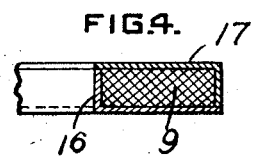

In the drawings accompanying and forming a part hereof, I have illustrated one embodiment of my invention in connection with a removable cover of a water meter. I desire it to be understood that this, however, is merely illustrative and that my invention may be employed in connection with gaskets used with materially different types of apparatus. Figure 1 is a partial vertical sectional view of a meter disclosing an embodiment of the invention associated with a rubber gasket located between the casing proper of the meter and a removable bottom plate of the meter casing. Fig. 2 is a fragmental sectional view on an enlarged scale of the apparatus shown in Fig. 1. Fig. 3 is a view similar to Fig. 2 illustrating a modification of the protective cover employed in connection with the gasket, and Fig. 4 is a still further modification in which the protective cover entirely encases the gasket.

In certain types of meters, it is desirable to provide a removable head or cover for the meter chamber. This is particularly essential in connection with meters exposed to atmospheric conditions and, therefore, liable to freeze. It is customary with some meter manufacturers to so construct such meters that freezing will occasion the breaking of lugs employed for holding a cover plate in place. When this takes place, it is, of course, necessary to renew the cover plate. I have found that where a gasket is employed for sealing the joint between the removable cover plate and the meter casing, the gasket is liable to, and does adhere to the contacting metal surfaces and thereby renders the removal of the cover plate somewhat difficult. It also makes it difficult to remove the interior parts of the meter, such as the measuring chamber, since the gasket is ordinarily so located that the measuring chamber cannot be withdrawn while the gasket or a piece of the gasket is in place. In addition, the removal of the cover plate is also likely to damage the gasket, rendering it unfit for further use.

In Figs. 1 and 2, I have illustrated a meter in which the casing 5 is provided with a bottom plate 6. The holding lugs 7 of this plate are designed to break in case ice is formed in the meter chamber 8. For the purpose of packing the joint between the plate 6 and the casing 5, I employ a gasket 9. In the drawings, the casing 5 is provided with a depending flange 10 which encircles the upper portion of the plate 6 and thereby resists deformation of the gasket, which might be occasioned by the internal pressure within the meter which is materially greater than atmospheric pressure. One lateral face of the gasket 9 contacts with the adjacent face of the removable plate 6, whereas the other lateral face lies adjacent to the face of a disc chamber casing 11 and an adjacent face of a reentrant flange 12 formed on the casing 5. The outer circumferential face lies adjacent to the depending flange 10. In order to prevent the gasket from adhering to the casings 5 and 11, I interpose a paper or other pliable strip 13 between it and the adjacent metal parts. As shown in Figs. 1 and 2, the pliable strip is L-shaped in cross-section, is pressed or otherwise formed to fit the upper lateral face and the outer peripheral face of the gasket, and is interposed between the gasket and the adjacent faces of the casing 11 and flanges 12 and 10.

Where paper is employed as the protective element, it may be treated with paraffin or a similar substance to prevent its adhering to the contacting metal surfaces. I have, however, found in connection with meters such as illustrated that it is unnecessary to specially treat the pliable protective strips where they are made of paper, since their tendency to adhere to the metal parts is very slight, and even if sticking occurs the paper will tear free of the gasket without injury thereto and may be replaced at trifling expense. Where my invention is employed in connection with meters such as illustrated, the operation of removing the cover is materially simplified since the protective strip is readily freed from the adjacent metal parts and consequently the rubber gasket comes away with the cover plate 6, since it will adhere to the contacting face of the plate. The gasket can then be torn free of the cover without being damaged and can be reused.

In Fig. 3, I have shown a modification in which the disc casing is provided with a depending flange 14 and in which the protective strip 13' is provided with a flange 15 which is located between the inner peripheral surface of the gasket 9 and the outer peripheral surface of the flange 14. With such an arrangement the gasket is prevented from sticking to the casing 5 and the disc casing 11 and at the same time is held against deformation by the co-operation of the flanges 10 and 14. I have found that where flanges similar to 10 or 14 are employed, the rubber gasket adheres very tenaciously to the flange, since the pressure to which the gasket is subjected seems to cause a flow of the rubber content of the gasket toward its peripheral edges. It is, therefore, essential to provide a protective strip so formed that it intervenes between the edges and adjacent metal parts.

In Fig. 4, I have illustrated a protective casing for the gasket which is so arranged that it entirely encloses the gasket. Such a casing is preferably formed in two parts 16 and 17, each of which is circular and is L-shaped in cross section. With such an arrangement the gasket is capable of yielding to the pressure of associated parts but at the same time it is prevented from sticking to either of the parts between which it is compressed.

It will be apparent that my invention may be employed with gaskets used in connection with any device or apparatus in which it is desirable to seal a joint by means of a compressible member such as a rubber gasket, and that various changes, modifications, omissions and additions may be made in the apparatus illustrated without departing from the spirit and scope of the invention, as set forth by the appended claim.

I claim as my invention:

In combination with a gasket, a meter body having an opening surrounded by an annular face against which said gasket is forced and an annular wall surrounding said gasket, a paper strip L-shaped in cross-section lying between said gasket and said annular face and between said gasket and said annular wall whereby sticking of the gasket to said face and wall is prevented, a cover for said opening movable directly toward said gasket, and bolts for securing said cover in place and whereby said gasket and strip are forced in packing engagement with said annular face.

In testimony whereof, I have hereunto subscribed my name this 25th day of October, 1921.

HORACE CHRISMAN.